(12) United States Patent
Huang

(10) Patent No.: US 9,442,301 B2
(45) Date of Patent: Sep. 13, 2016

(54) AUTOSTEREOSCOPIC DISPLAY DEVICE AND AUTOSTEREOSCOPIC DISPLAY METHOD USING THE SAME

(71) Applicant: DELTA ELECTRONICS, INC., Kuei San (TW)

(72) Inventor: June-Jei Huang, Kuei San (TW)

(73) Assignee: DELTA ELECTRONICS, INC. (TW)

( * ) Notice: Subject to any disclaimer, the term of this patent is extended or adjusted under 35 U.S.C. 154(b) by 184 days.

(21) Appl. No.: 14/546,429

(22) Filed: Nov. 18, 2014

(65) Prior Publication Data
US 2016/0062130 A1 Mar. 3, 2016

(30) Foreign Application Priority Data

Aug. 28, 2014 (TW) .............. 103129626 A

(51) Int. Cl.
*G03B 35/26* (2006.01)
*H04N 13/04* (2006.01)
*G02B 27/22* (2006.01)
*G02B 27/26* (2006.01)

(52) U.S. Cl.
CPC ........... *G02B 27/26* (2013.01); *G02B 27/2214* (2013.01); *G03B 35/26* (2013.01); *H04N 13/0413* (2013.01)

(58) Field of Classification Search
CPC .............. G02B 27/2214; G02B 27/26; G02B 27/2228; G02B 27/2242; G02B 27/225; G03B 35/18; G03B 35/20; G03B 35/26; H04N 13/0402; H04N 13/0409; H04N 13/0413; H04N 13/0415
USPC ................. 353/7, 8; 359/462, 466, 471, 472
See application file for complete search history.

(56) References Cited

U.S. PATENT DOCUMENTS

| 5,953,156 A | * | 9/1999 | Muench ............. G02B 27/2235 |
|---|---|---|---|
| | | | 353/7 |
| 2002/0118452 A1 | * | 8/2002 | Taniguchi .......... G02B 27/2214 |
| | | | 359/463 |
| 2005/0046795 A1 | | 3/2005 | Toeppen |
| 2005/0052738 A1 | * | 3/2005 | Perlin ................ G02B 27/0093 |
| | | | 359/462 |
| 2010/0026795 A1 | | 2/2010 | Moller et al. |
| 2012/0057006 A1 | | 3/2012 | Joseph et al. |
| 2013/0242062 A1 | | 9/2013 | Ming |
| 2014/0071352 A1 | | 3/2014 | Huang |

FOREIGN PATENT DOCUMENTS

TW        I406115        8/2013

* cited by examiner

*Primary Examiner* — William C Dowling
*Assistant Examiner* — Ryan Howard
(74) *Attorney, Agent, or Firm* — Hauptman Ham, LLP

(57) ABSTRACT

An autostereoscopic display device includes a projector module, a screen, and a window. The projector module includes a first projector and a second projector. The first projector is used for providing a first image unit with a first polarization, and the second projector is used for providing a second image unit with a second polarization. The screen is used for reflecting the first image unit and the second image unit. The screen is disposed at the same side of the projector module and the window, and a projective location of the projector module on the window is at an edge of the window. The window includes a divided visual-field area and a liquid-crystal silt layer. The liquid-crystal silt layer is used for allowing a portion of the first image unit and a portion of the second image unit passing through the divided visual-field area to pass therethrough.

13 Claims, 11 Drawing Sheets

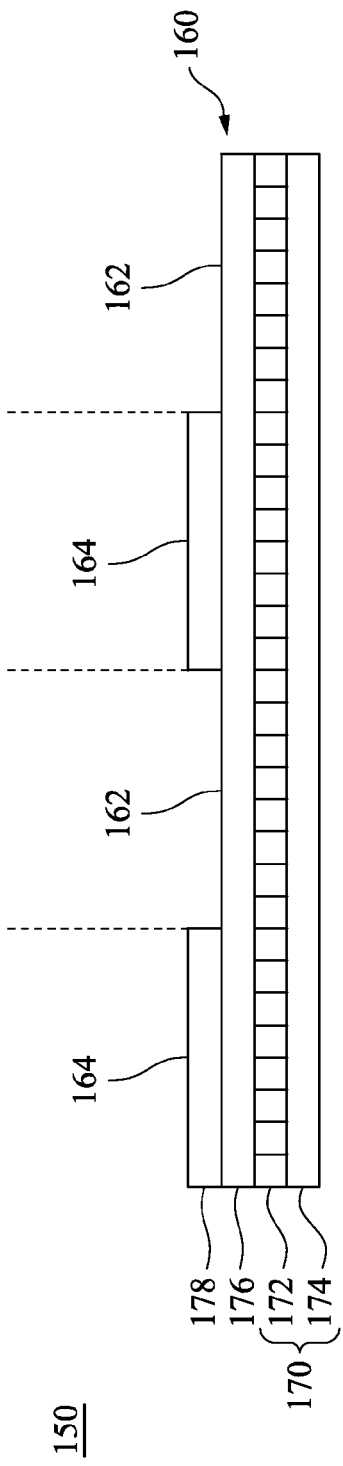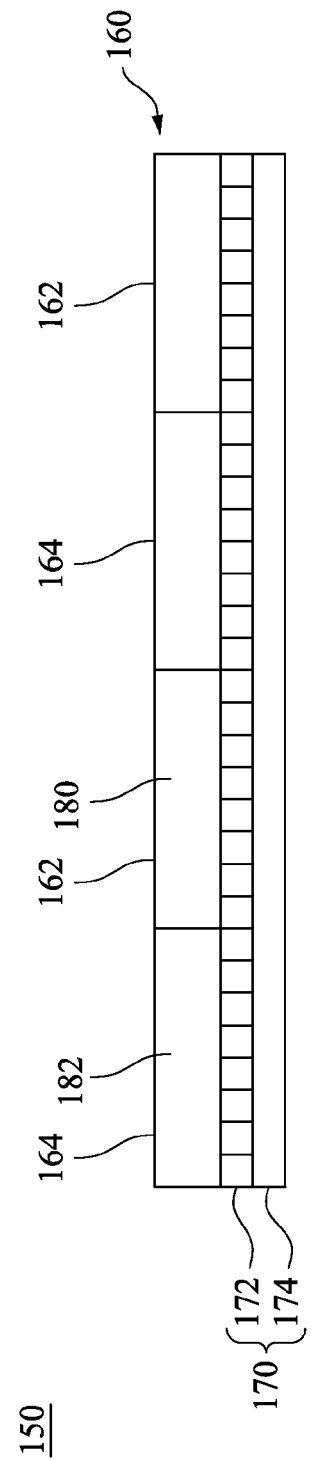

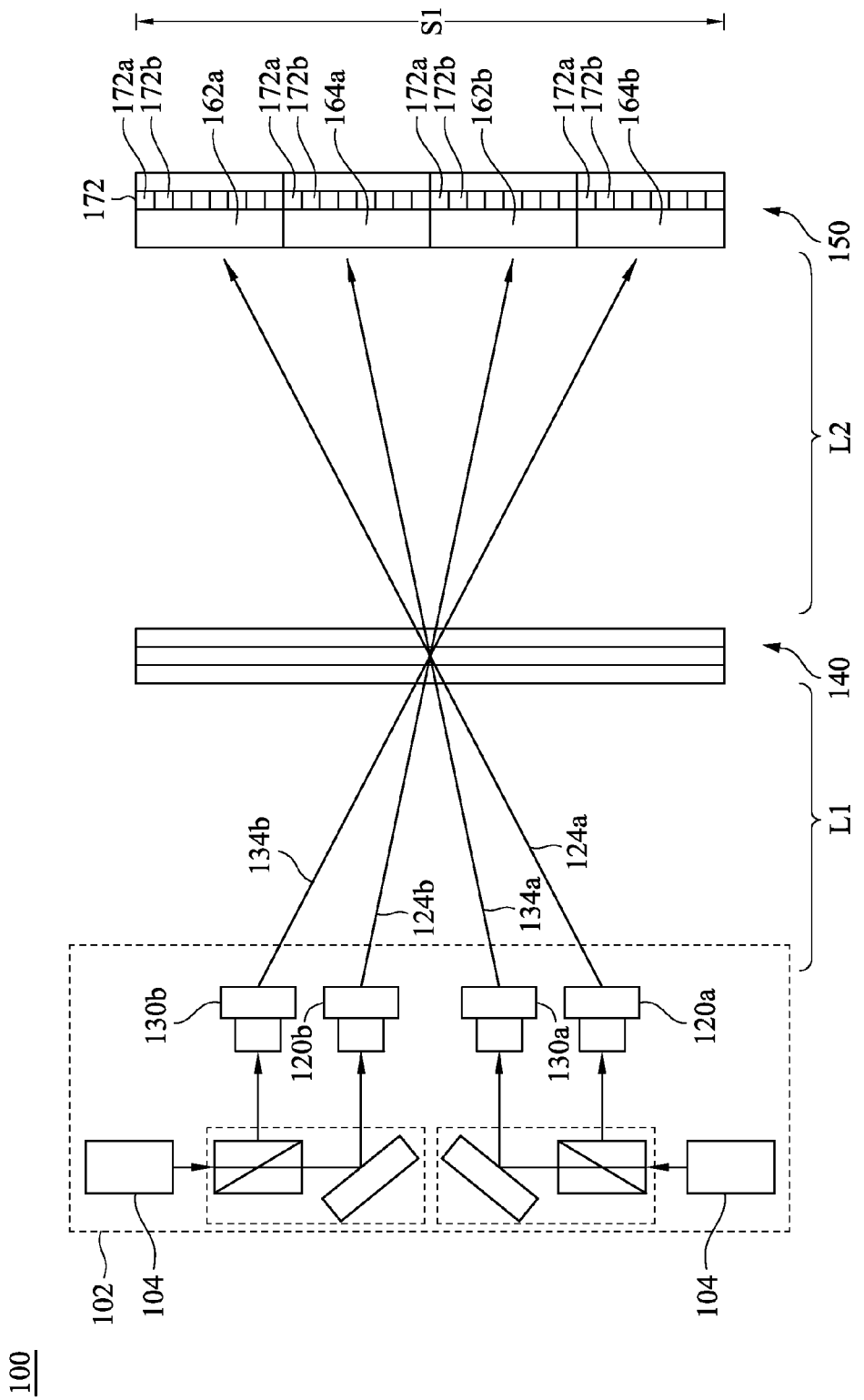

AUTOSTEREOSCOPIC DISPLAY DEVICE AND AUTOSTEREOSCOPIC DISPLAY METHOD USING THE SAME

RELATED APPLICATIONS

This application claims priority to Taiwan Application Serial Number 103129626, filed Aug. 28, 2014, which is herein incorporated by reference.

BACKGROUND

1. Technical Field

The present invention relates to an autostereoscopic display device. More particularly, the present invention relates to an autostereoscopic display device providing a stereoscopic image without special glasses.

2. Description of Related Art

By exploiting the binocular parallax of humans, a stereoscopic display provides two different images respectively to two eyes of an observer, such that the observer can experience a stereoscopic image. Unlike other types of stereoscopic displays which require special glasses to distinguish left-eye and right-eye images, an autostereoscopic display transmit light beams of different images to different spatial positions. The eyes of an observer can receive different images from different angles so that the observer perceives a stereoscopic image without the special glasses. The autostereoscopic display technology overcomes the problems associated with the inconvenience of glasses in stereoscopic display technology, and has become an area of major development currently.

SUMMARY

An aspect of the present invention provides an autostereoscopic display device including projectors used as image sources and a liquid-crystal silt layer for controlling images that delivered from different angles, such that an observer perceives a stereoscopic image without wearing special glasses. In addition, first visual fields and second visual fields are disposed on the liquid-crystal silt layer, such that the images provided by the projectors are not interfered with each other and the blurred stereoscopic image is prevented.

An aspect of the present invention is to provide an autostereoscopic display device including a projector module, a screen, and a window. The projector module includes a first projector and a second projector. The first projector is used to provide a first image unit with a first polarization, in which the first image unit includes first images provided in a time sequence. The second projector is used to provide a second image unit with a second polarization, in which the second image unit includes second images provided in the time sequence. The screen is used to reflect the first image unit and the second image unit. The screen is disposed at the same side of the projector module and the window, and a projective location of the projector module on the window is at an edge of the window. The window includes a divided visual-field area and a liquid-crystal silt layer. The divided visual-field area is used to receive the first image unit and the second image unit from the screen, in which the divided visual-field area includes first visual fields and second visual fields. The first visual fields allow the light beam with the first polarization to pass therethrough, and the second visual fields allow light the beam with the second polarization to pass therethrough. The liquid-crystal silt layer is used to allow a portion of the first image unit and a portion of the second image unit passing through the divided visual-field area to pass therethrough.

In one or more embodiments, the projector module further includes a light source and a polarizing beam splitter module. The light source is used to provide a light beam. The polarizing beam splitter module includes a mirror and a polarizing beam splitter. The polarizing beam splitter is used to convert the light beam into a first light beam with the first polarization and a second light beam with the second polarization. The first light beam is reflected from the polarizing beam splitter to the first projector, and the second light beam is reflected from the mirror to the second projector.

In one or more embodiments, the projector module further includes a first light source, a second light source, a first polarizing beam splitter, and a second polarizing beam splitter. The first light source is used to provide the first projector with a first light beam. The first light beam passing through the first polarizing beam splitter is converted into the first polarization. The second light source is used to provide the second projector with a second light beam. The second light beam passing through the second polarizing beam splitter is converted into the second polarization.

In one or more embodiments, the screen has a curved surface, and a curvature center of the curved surface is located at the same side with the projector module.

In one or more embodiments, the screen further includes a lens for respectively guiding the first image unit and the second image unit provided by the projector module to the first visual fields and the second visual fields.

In one or more embodiments, the liquid-crystal silt layer includes liquid-crystal silts and a polarizing filter. The liquid-crystal silts are used to define the polarization of the light beam entering the liquid-crystal silt layer. The polarizing filter is disposed at a side of the liquid-crystal silts opposite to the divided visual-field area, in which the polarizing filter allows the light beam with one single polarization to pass therethrough.

In one or more embodiments, the number of the liquid-crystal silts corresponding to each of the first visual fields and the number of the liquid-crystal silts corresponding to each of the second visual fields are the same.

In one or more embodiments, the window further includes a polarizing plate and wave plates. A polarizing plate is disposed on the divided visual-field area for allowing the light beam with the first polarization to pass therethrough. The wave plates are disposed on a portion of the polarizing plate. The wave plates are half-wave plates. Projective locations of the wave plates on the divided visual-field area coincide with the second visual fields, and exposed areas of the polarizing plate on which no wave plates are disposed coincide with the first visual fields.

In one or more embodiments, the window further includes first polarizing sheets and second polarizing sheets. The first polarizing sheets are disposed on the divided visual-field area for allowing the light beam with the first polarization to pass therethrough, in which projective locations of the first polarizing sheets on the divided visual-field area coincide with the first visual fields. The second polarizing sheets disposed on the divided visual-field area for allowing light beam with the second polarization to pass therethrough, in which projective locations of the second polarizing sheets on the divided visual-field area coincide with the second visual fields.

An aspect of the present invention is to provide a method for providing an autostereoscopic display. At least one first projector for providing a first image unit with a first polarization is provided, in which the first image unit includes first images provided in a time sequence. At least one second projector for providing a second image unit with a second polarization is provided, in which the second image unit includes second images provided in the time sequence. The first image unit and the second image unit are projected on a screen. The first image unit and the second image unit are reflected from the screen to a window, in which the window includes first visual fields and second visual fields arranged alternately. The first visual fields allow the light beam with the first polarization to pass therethrough, and the second visual fields allow the light beam with the second polarization to pass therethrough. Liquid-crystal silts of the window are controlled to be actuated in the time sequence. The first images and the second images respectively pass through the liquid-crystal silts actuated in the first visual fields and the second visual fields.

In one or more embodiments, the method further includes guiding the first image unit and the second image unit to the first visual fields and the second visual fields by a lens of the screen.

In one or more embodiments, the step of controlling the liquid-crystal silts of the window further includes controlling two of the liquid-crystal silts corresponding to each of the first visual fields, such that one of the first images passes through the two liquid-crystal silts of each of the first visual fields of the window. Two of the liquid-crystal silts corresponding to each of the second visual fields are controlled, such that one of the second images passes through the two liquid-crystal silts of each of the second visual fields of the window.

In one or more embodiments, the numbers of the plural first projectors and the first visual fields are the same, and the first image units of the first projectors are respectively guided to the different first visual fields. The numbers of the plural second projectors and the second visual fields are the same, and the second image units of the second projectors are respectively guided to the different second visual fields.

The autostereoscopic display device of the present invention outputs images which can obtained by an observer without needing to wear glasses. The first visual fields and the second visual fields are disposed on the window, such that the images with different angles provided by the projectors do not interfere with each other. Further, the images selectively pass through the window, such that the observer can obtain a stereoscopic image from an observing surface.

BRIEF DESCRIPTION OF THE DRAWINGS

FIG. 6A is a schematic diagram of a window of an autostereoscopic display device according to an embodiment of the present invention;

FIG. 6B is a schematic diagram of a window of an autostereoscopic display device according to another embodiment of the present invention;

FIG. 11 is a schematic diagram showing an optical path of an autostereoscopic display device according to the second embodiment of the present invention.

DETAILED DESCRIPTION

Figure 1:
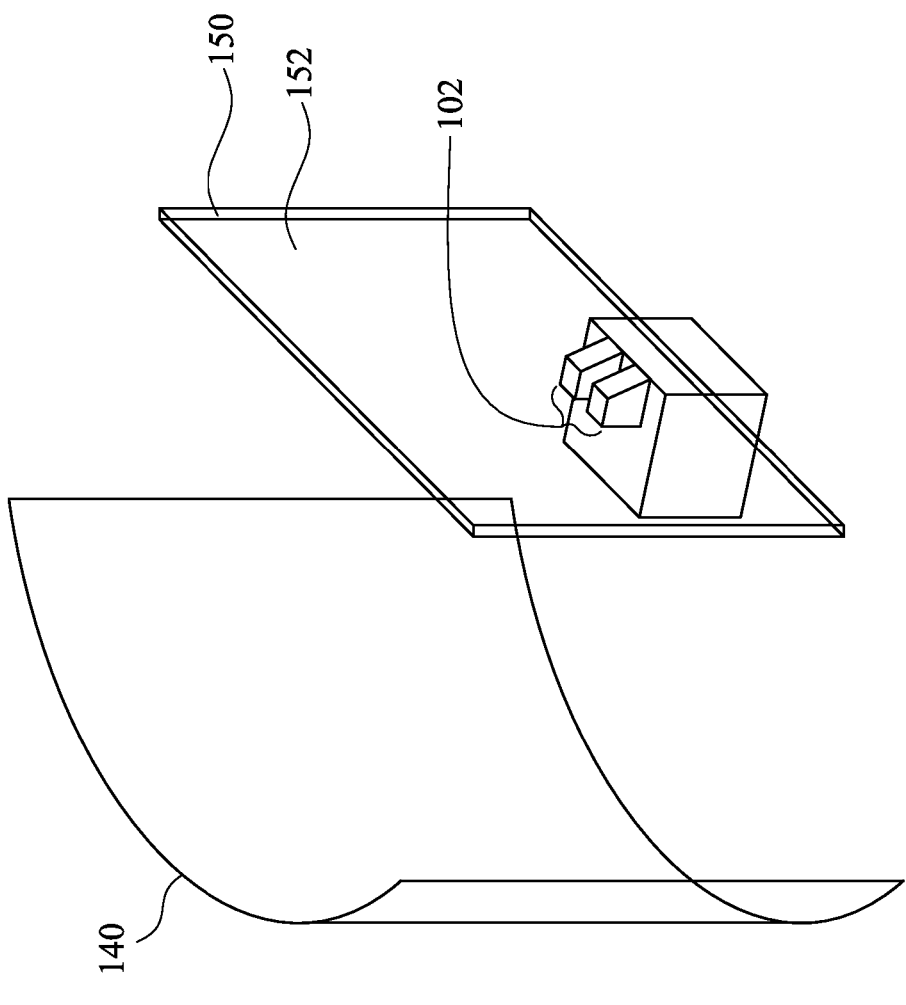
FIG. 1 is a schematic 3D diagram of an autostereoscopic display device according to a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one or more embodiments of the present invention, an observer obtains a stereoscopic image from an autostereoscopic display device without wearing special glasses. Images of the autostereoscopic display device of the present invention are divided into p polarization and s polarization, and then the angles of the images passing through a window are controlled by liquid-crystal silts such that a user can obtain a stereoscopic image without wearing the special glasses. In addition, the autostereoscopic display device of the present invention includes projectors for providing the images with different view angles at the same time, thereby improving resolution and brightness of the images.

FIG. 1 is a schematic 3D diagram of an autostereoscopic display device according to a first embodiment of the present invention. An autostereoscopic display device 100 includes a projector module 102, a screen 140 and a window 150, in which the window 150 includes an observing surface 152. The projector module 102 and the window 150 are disposed at the same side of the screen 140, and therefore the autostereoscopic display device 100 is a display device of the front projection type.

Figure 2:
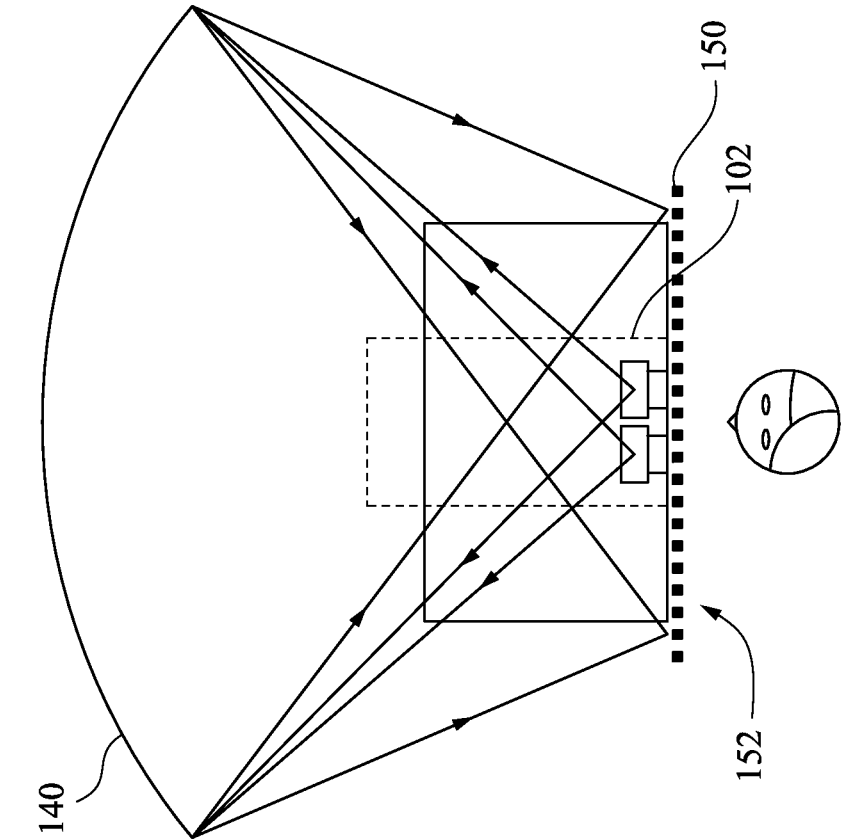
FIG. 2 is a schematic top view of an autostereoscopic display device according to the first embodiment of the present invention.

FIG. 2 is a schematic top view of an autostereoscopic display device according to the first embodiment of the present invention. After the projector module 102 projects images to the screen 140, the images are reflected from the screen 140 toward the window 150, and an observer can see the images provided by the autostereoscopic display device 100 from the observing surface 152.

According to an embodiment, the screen 140 has a curved surface, in which a curvature center of the curved surface is located at the same side with the projector module 102. The images projected by the projector module 102 can be reflected to the window 150 more effectively by the curved surface of the screen 140.

As shown in FIG. 1 and FIG. 2, the projector module is disposed near the window 150 and between the screen 140 and the window 150, in which a projective location of the projector module 102 on the window 150 is at an edge of the window 150.

Figure 3:
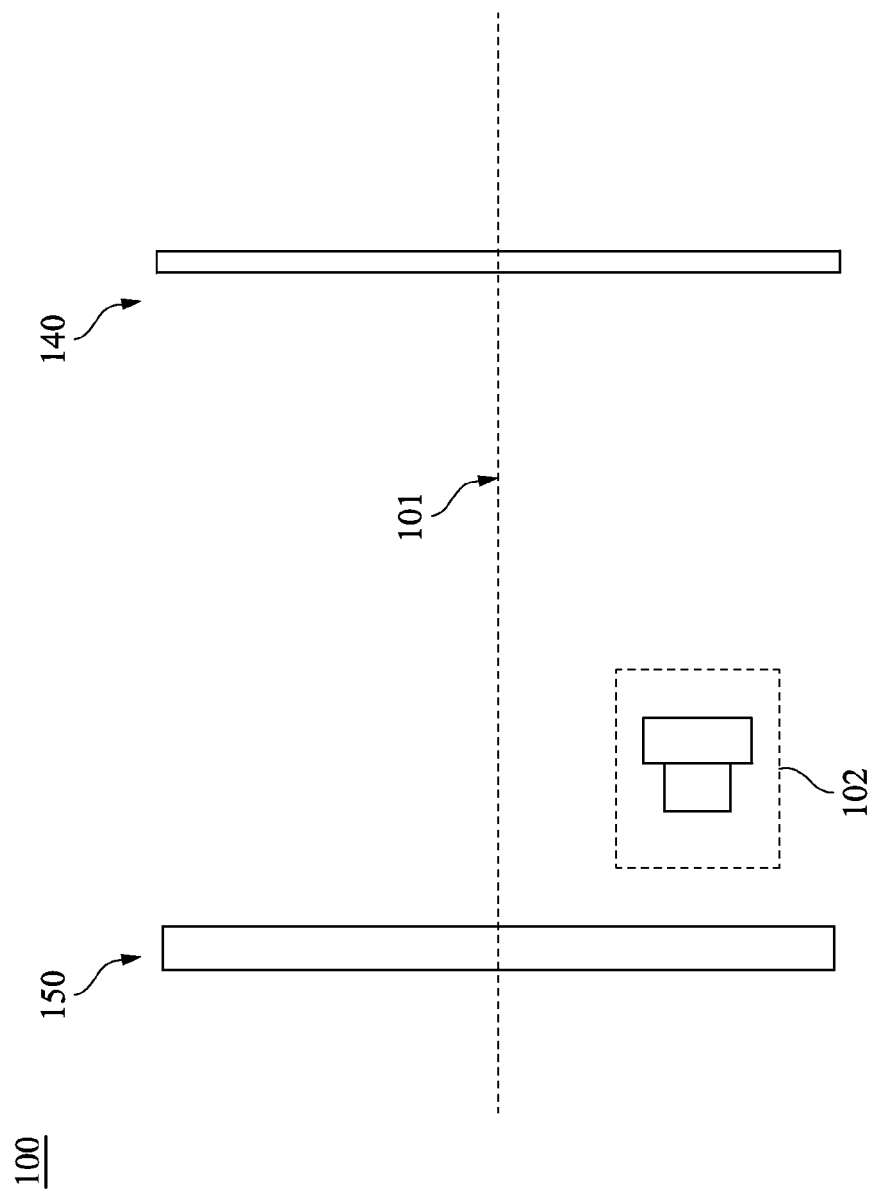
FIG. 3 is a schematic side view of an autostereoscopic display device according to the first embodiment of the present invention.

FIG. 3 is a schematic side view of an autostereoscopic display device according to the first embodiment of the present invention. As previously described, the projective location of the projector module 102 on the window 150 is at the edge of the window 150, and therefore the projector module 102 is located at a side of a central axis 101 of the screen 140 and the window 150.

Figure 4:
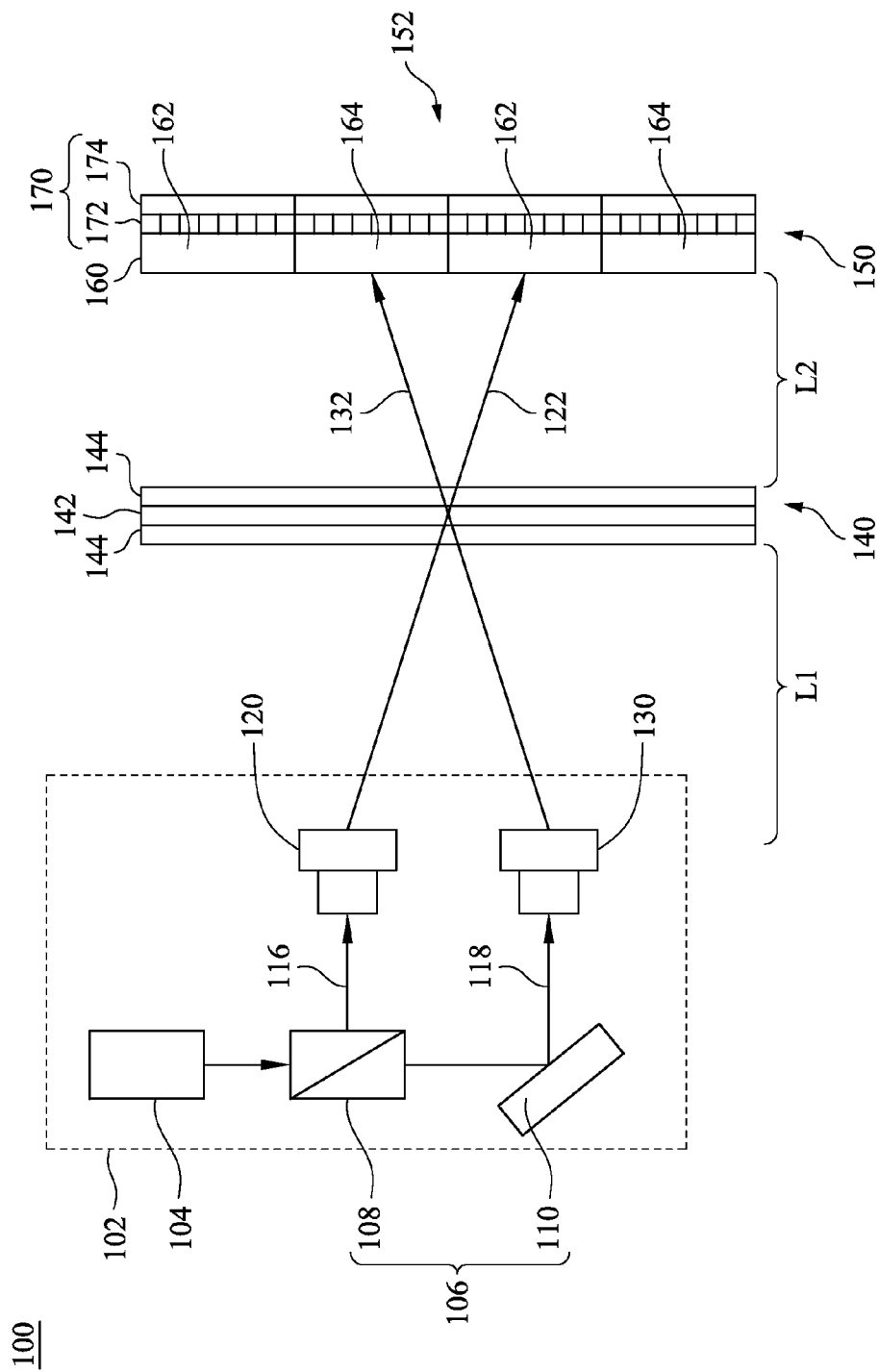
FIG. 4 is a schematic diagram showing an optical path of an autostereoscopic display device according to the first embodiment of the present invention.

FIG. 4 is a schematic diagram showing an optical path of an autostereoscopic display device according to the first embodiment of the present invention. The autostereoscopic display device 100 includes the projector module 102, the screen 140 and the window 150. In FIG. 4, images are projected from the projector module 102 to the screen 140 along a path L1, and the images are reflected from the screen 140 to the window 150 along a path L2. For the convenience of explanation, two optical paths that entering and reflected from the screen 140 in FIG. 3 are unfolded and redrawn as path L1 and path L2 in FIG. 4.

The projector module 102 includes a first projector 120 and a second projector 130. The first projector 120 is used for providing a first image unit 122 with a first polarization. The second projector 130 is used for providing a second image unit 132 with a second polarization, in which both the first image unit 122 and the second image unit 132 include images provided in a time sequence. For example, in the first projector 120, the images of the first image unit 122 are displayed in the time sequence. Thus, when the first projector 120 provides the first image unit 122, the images of the first image unit 122 are continuously displayed, in which the images of the first image unit 122 at different time points are different.

The projector module 102 further includes a light source 104 and a polarizing beam splitter module 106. The light source 106 is used for providing the first projector 120 and the second projector 130 with light beams. The polarizing beam splitter module 106 includes a polarizing beam splitter 108 and a mirror 110.

The polarizing beam splitter 108 is used for allowing an incident light beam to be reflected and transmitted, in which whether the light beam is reflected or transmitted depends on the polarization of the light beam. The light source 104 emits light beams with two polarizations, in which the light beam with the first polarization is reflected from the polarizing beam splitter 108 to the first projector 120. The light beam with the second polarization passes through the polarizing beam splitter 108 and enters the mirror 110, and then the light beam with the second polarization is reflected from the mirror 110 to the second projector 130.

With the polarizing beam splitter 108, light beams of the light source 104 are converted into a first light beam 116 with the first polarization and a second light beam 118 with the second polarization. The first light beam 116 enters the first projector 120, and the second light beam 118 enters the second projector 130.

The screen 140 is used for reflecting the first image unit 122 and the second image unit 132 to window 150. The screen 140 is a polarization preserving screen and includes a diffusion-reflecting layer 142, in which the diffusion-reflecting layer is formed from silver. According to an embodiment, the screen 140 further includes a lens 144, in which the lens 144 is a fresnel lens, but embodiments of the present invention are not limited thereto. The lens 144 is used for respectively guiding the first image unit 122 and the second image unit 132 provided by the projector module 102 to the first visual fields 162 and the second visual fields 164 of the window 150.

Figure 5:
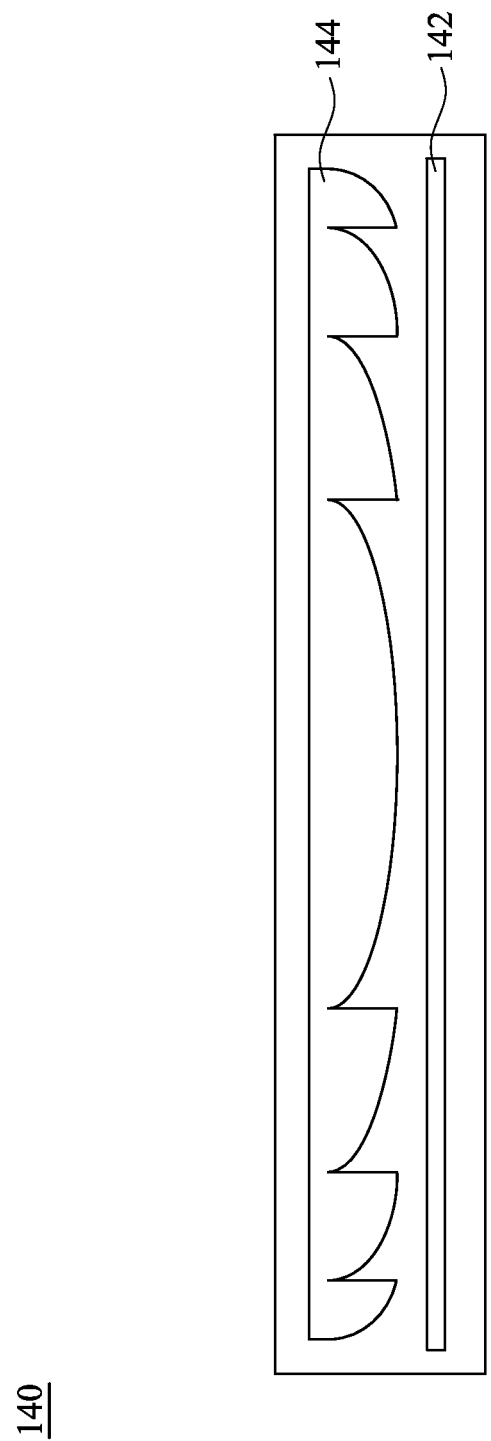
FIG. 5 is a schematic diagram showing the structure of a screen of an autostereoscopic display device according to an embodiment of the present invention.

FIG. 5 is a schematic diagram showing the structure of a screen of an autostereoscopic display device according to an embodiment of the present invention. The screen 140 includes the diffusion-reflecting layer 142 and the lens 144. When a light beam passes through the lens 144 and enters the diffusion-reflecting layer 142, the light beam is reflected from the diffusion-reflecting layer 142 to the lens 144 and guided by the lens 144.

Reference is made back to FIG. 4. As previously described, the path L1 and the path L2 are respectively developed in FIG. 4. At the end of the path L1, the images enter the diffusion-reflecting layer 142 from the lens 144. At the start of the path L2, the images enter the lens 144 from the diffusion-reflecting layer 142. In other words, the images respectively pass through the lenses 144 in path L1 and the path L2. For convenience of explanation, the lenses 144 illustrated in the path L1 and the path L2 actually belong to one component, and the lenses 144 illustrated as two elements are mainly used to indicate the numbers of the images passing through the lens.

The window 150 includes a divided visual-field area 160 and a liquid-crystal silt layer 170. The divided visual-field area 160 is used for receiving the first image unit 122 and the second image unit 132 from the screen 140. The divided visual-field area 160 includes first visual fields 162 and second visual fields 164 arranged alternately, in which the first visual fields 162 allow the light beam with the first polarization to pass therethrough, and the second visual fields 164 allow the light beam with the second polarization to pass therethrough.

When the first image unit 122 and the second image unit 132 are reflected from the screen 140 to the window 150 through the guiding of the lens 144, the output of the autostereoscopic display device 100 may be affected due to the overlap between the first image unit 122 and the second image unit 132. Therefore, with the disposition of the first visual fields 162 and visual fields 164 on the divided visual-field area 160, the distributions of the first image unit 122 and the second image unit 132 on the window 150 can be controlled.

In other words, with the lens 144 of the screen 140 and the divided visual-field area 160 of the window 150, the first image unit 122 and the second image unit 132 with the specific polarizations can correctly enter the corresponding positions of the window 150.

The liquid-crystal silt layer 170 is used for allowing a portion of the first image unit 122 and a portion of the second image unit 132 passing through the divided visual-field area 160 to pass therethrough. According to an embodiment, the liquid-crystal silt layer 170 includes liquid-crystal silts 172 and a polarizing filter 174.

The liquid-crystal silts 172 are used for defining the polarization of light beam entering the liquid-crystal silt layer 170. For example, when a light beam with p polarization enters the liquid-crystal silts 172, the light beam is converted into the light beam with s polarization by using the liquid-crystal disposition of the liquid-crystal silts 172 after passing through the liquid-crystal silts 172. Similarly, with the liquid-crystal disposition of the liquid-crystal silts 172, the light beam with p polarization is still p polarized after passing through the liquid-crystal silts 172. According to an embodiment, the number of the liquid-crystal silts 172 corresponding to each of the first visual fields 162 and that to each of the second visual fields 164 are the same. The polarizing filter 174 is disposed at a side of the liquid-crystal silts 172 opposite to the divided visual-field area 160, in which the polarizing filter 174 allows light beam with single polarization to pass therethrough.

According to an embodiment, the first image unit 122 provided by the first projector 120 is p polarized, and the second image unit 132 provided by the second projector 130 is s polarized. The first visual fields 162 allow light beam with p polarization to pass therethrough, and the second visual fields 164 allow light beam with s polarization to pass therethrough. The polarizing filter 174 allows light beam with p polarization to pass therethrough.

After the first image unit 122 enters the liquid-crystal silts 172 through the first visual fields 162, a portion of the first image unit 122 with p polarization is converted into s polarization through the liquid-crystal silts 172, such that the first image unit 122 passing through the liquid-crystal silts 172 has p polarization and s polarization. The first image unit 122 with p polarization will pass through the polarizing filter 174. On the contrary, the first image unit 122 with s polarization cannot pass through the polarizing filter 174.

With the disposition of the liquid-crystal silts 172 together with the polarizing filter 174, the liquid-crystal silt layer 170 can selectively allow the first image unit 122 and the second image unit 132 to pass through the window 150. Further, a user can obtain the first image unit 122 and the second image unit 132 from the observing surface 152 of the window 150.

As used herein, the term "selectively allow" means the first image unit 122 and the second image unit 132 can pass through the liquid-crystal silts 172 by controlling the liquid-crystal silts 172. Since the number and positions of the liquid-crystal silts 172 to be controlled are selectable, the positions with the first image unit 122 and the second image unit 132 passing through are also selectable. In other words, the window 150 is used as an auxiliary component for assisting the user to view the screen 140. According to an embodiment, the projected directions of the first image unit 122 and the second image unit 132 respectively provided by the first projector 120 and the second projector 130 can be kept fixed, and the directions and angles of the first image unit 122 and the second image unit 132 passing through the window 150 are determined by controlling various positions of the liquid-crystal silts 172.

FIG. 6A is a schematic diagram of a window of an autostereoscopic display device according to an embodiment of the present invention. The window 150 includes the divided visual-field area 160 and the liquid-crystal silt layer 170, in which the divided visual-field area 160 includes first visual fields 162 and second visual fields 164 arranged alternately.

According to an embodiment, the window 150 includes a polarizing plate 176 and wave plates 178. The polarizing plate 176 is disposed on the divided visual-field area 160 and is used for allowing light beam with the first polarization to pass therethrough. The wave plates 178 are disposed on a portion of the polarizing plate 176, in which the wave plates 178 are half-wave plates. Projective locations of the wave plates 178 on the divided visual-field area 160 coincide with the second visual fields 164, and exposed areas of the polarizing plate 176 on which no wave plates 178 are disposed coincide with the first visual fields 162.

After a light beam with linear polarization pass through the wave plates 178, the half-wave phase difference of the light beam is generated, such that polarization of the light beam is converted into another polarization. For example, a light beam with p polarization is converted into s polarization after passing through the wave plates 178.

According to an embodiment, the polarizing plate 176 allows a light beam with p polarization to pass therethrough. When a light beam with p polarization and a light beam with s polarization travel toward the divided visual-field area 160 of the window 150 at the same time, the light beam with p polarization directly passes through the polarizing plate 176 and enters the liquid-crystal silt layer 170. On the other hand, the light beam with s polarization is converted into p polarization and then enters the liquid-crystal silt layer 170 through the polarizing plate 176.

The exposed areas with the wave plates 178 with no wave plates 178 respectively allow light beams with s and p polarizations to pass therethrough. Therefore, the first visual fields 162 and the second visual fields 164 exactly allow light beams with s and p polarizations to pass therethrough respectively. Then, the disposition of the liquid-crystal silts 172 together with the polarizing filter 174 of the liquid-crystal silt layer 170 allows the light beams to selectively pass through the window 150.

FIG. 6B is a schematic diagram of a window of an autostereoscopic display device according to another embodiment of the present invention. The window 150 includes the divided visual-field area 160 and the liquid-crystal silt layer 170, in which the divided visual-field area 160 includes first visual fields 162 and second visual fields 164 arranged alternately.

According to an embodiment, the window 150 includes first polarizing sheets 180 and second polarizing sheets 182. The first polarizing sheets 180 are disposed on the divided visual-field area 160 for allowing light beam with the first polarization to pass therethrough. Further, projective locations of the first polarizing sheets 180 on the divided visual-field area 160 coincide with the first visual fields 162.

The second polarizing sheets 182 are disposed on the divided visual-field area 160 for allowing light beam with the second polarization to pass therethrough. Further, projective locations of the second polarizing sheets 182 on the divided visual-field area 160 coincide with the second visual fields 164.

According to an embodiment, the first polarizing sheets 180 allow the light beam with p polarization to pass therethrough, and the second polarizing sheets 182 allow the light beam with s polarization to pass therethrough. When a light beam with p polarization and a light beam with s polarization travel toward the divided visual-field area 160 of the window 150 at the same time, the light beam with p polarization directly passes through the first polarizing sheets 180 and enters the liquid-crystal silt layer 170, and the light beam with s polarization directly passes through the second polarizing sheets 182 and enters the liquid-crystal silt layer 170.

The areas with the first polarizing sheets 180 and the second polarizing sheets 182 respectively allow light beams with s and p polarizations to pass therethrough. Therefore, the first visual fields 162 and the second visual fields 164 exactly allow light beams with s and p polarizations to pass therethrough respectively. Similarly, the associative disposition of the liquid-crystal silts 172 and the polarizing filter 174 of the liquid-crystal silt layer 170 allows the light beams to selectively pass through the window 150.

Figure 7:
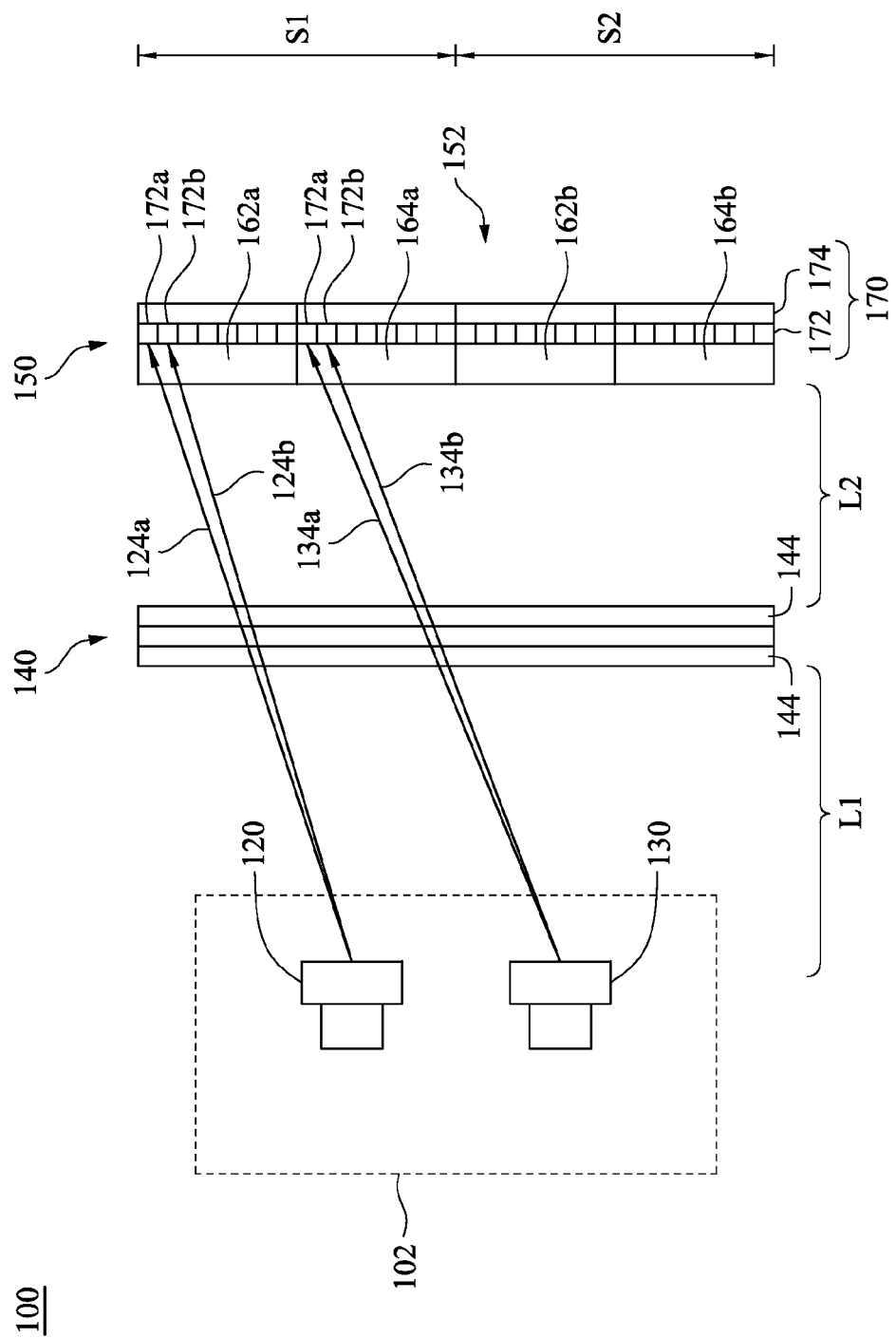
FIG. 7 is a schematic diagram showing an optical path of operating an autostereoscopic display device according to the first embodiment of the present invention.

FIG. 7 is a schematic diagram showing an optical path of operating an autostereoscopic display device according to the first embodiment of the present invention. The autostereoscopic display device 100 includes the projector module 102, the screen 140, and the window 150. In FIG. 7, images are projected from the projector module 102 to the screen 140 along a path L1, and the images are reflected from the screen 140 to the window 150 along a path L2. For the convenience of explanation, two optical paths that entering and reflected from the screen 140 in FIG. 3 are unfolded and redrawn as path L1 and path L2 in FIG. 7.

The projector module 102 includes the first projector 120 and the second projector 130. The window 150 includes the first visual fields 162a-162b, the second visual fields 164a-164b, and the liquid-crystal silt layer 170, in which the liquid-crystal silt layer 170 includes the liquid-crystal silts 172 and the polarizing filter 174. The first visual field 162a and the second visual field 164a belong to a first observing region S1, and the first visual field 162b and the second visual field 164b belong to a second observing region S2. Further, the numbers of the liquid-crystal silts 172 corresponding to the first visual fields 162a-162b and the second visual fields 164a-164b are 8, respectively.

The first projector 120 is used for providing the first image unit with the first polarization, in which the first image unit includes first images 124a-124b provided in a time sequence. The second projector 130 is used for providing the second image unit with the second polarization, in which the second image unit includes second images 134a-134b provided in the time sequence. The sequence has multiple time intervals. As previously described, the projecting directions of the first image unit and the second image unit can be kept fixed, and the directions and angles of the first image unit and the second image unit passing through the window 150 are determined by controlling the various positions of the liquid-crystal silts 172. Further, the practical directions of the first images 124a-124b and the second images 134a-134b are divergent. For the convenience of explanation, the numbers of the first images 124a-124b and the second images 134a-134b are respectively illustrated as one.

In the first images 124a-124b, the first image 124a is different from the first image 124b, and the first images 124a-124b are projected from the first projector 120 in different time intervals. For example, the first image unit displays the first image 124a at the first time interval, and then the first image unit displays the first image 124b at the next time interval. Correspondingly, when the first image unit displays the first image 124a, the second image unit displays the second image 134a. Similarly, when the first image unit displays the first image 124b, the second image unit simultaneously displays the second image 134b.

The first projector 120 and the second projector 130 project the images on the screen 140, and the images are reflected from the screen 140 to the window 150. According to an embodiment, the first images 124a-124b and the second images 134a-134b are respectively guided to the first visual fields 162a-162b and the second visual fields 164a-164b by the lens 144 of the screen 140.

Then, the liquid-crystal silts 172 of the window 150 are controlled to be actuated in the time sequence. As previously described, with the disposition of the liquid-crystal silts 172 together with the polarizing filter 174, the window 150 can selectively allow a light beam with a specific polarization to pass therethrough. As used herein, the term "the liquid-crystal silts are actuated" means allowing the specific first images 124a-124b and the second images 134a-134b pass through the window 150.

After the first images 124a-124b and the second images 134a-134b respectively pass through the liquid-crystal silts 172 actuated in the first visual fields 162a-162b and the second visual fields 164a-164b, a user can obtain the first images 124a-124b and the second images 134a-134b from the observing surface 152 of the window 150.

The first images 124a-124b, the second images 134a-134b, and the liquid-crystal silts 172 are switched in the same sequence, such that the first images 124a-124b passing through the window 150 at different time intervals are different from each other. Similarly, the second images 134a-134b passing through the window 150 are different from each other.

For example, in the first observing region S1, only the liquid-crystal silt 172a is actuated in the first visual field 162a at the first time interval, and hence the first image 124a passes through the window 150 after passing through the liquid-crystal silt 172a. Similarly, only the liquid-crystal silt 172a is actuated in the second visual field 164a at the first time interval, and hence the second image 134a passes through the window 150 after passing through the liquid-crystal silt 172a.

Then, at the next time interval, only the liquid-crystal silt 172b is actuated in the first visual field 162a, and hence the first image 124b passes through the window 150 after passing through the liquid-crystal silt 172b. Correspondingly, only the liquid-crystal silt 172b is actuated in the second visual field 164a, and hence the second image 134b passes through the window 150 after passing through the liquid-crystal silt 172a.

For the convenience of explanation, only two of the first images (the first images 124a-124b) are illustrated in FIG. 7. According to an embodiment, the numbers of the first images and the liquid-crystal silts 172 corresponding to the first visual field 162a are the same. After the eight liquid-crystal silts 172 corresponding to the first visual field 162a and the second visual field 164a are synchronously actuated in turns in the time sequence and enable the corresponding images to pass through, the output of the first observing region S1 is completed. Therefore, a user corresponding to the first observing region S1 can obtain a stereoscopic image from the observing surface 152 of the window 150.

Similarly, after the eight liquid-crystal silts 172 corresponding to the first visual field 162b and the second visual field 164b are synchronously actuated in turns in the time sequence, the output of the second observing region S2 is completed. Therefore, a user corresponding to the second observing region S2 can obtain a stereoscopic image from the observing surface 152 of the window 150, in which the outputs of the images of the first observing region S1 and the second observing region S2 are synchronously performed.

Furthermore, for example, when the frames per second (FPS) of output of the autostereoscopic display device 100 is 60, each of the liquid-crystal silts 172 corresponding to the first visual fields 162a-162b and the second visual fields 164a-164b outputs 60 images in one second. Therefore, when the number of the liquid-crystal silts 172 corresponding to the first visual fields 162a-162b and the second visual fields 164a-164b is 8, the images provided by the first projector 120 and the second projector 130 are equal to 480 per second (60*8=480).

Summing up the above, the autostereoscopic display device 100 of the present invention projects various images with different angles through the window 150, such that a user can receive the images with different angles from the observing surface 152 and obtain a stereoscopic image. However, a person having ordinary skill in the art may choose the proper number of the liquid-crystal silts 172.

The principle of the autostereoscopic display device of the present invention regarding how to provide a user with the stereoscopic image is described in the foregoing embodiments. In the following embodiments, variations of actuating the liquid-crystal silts in turns will be further described.

Figure 8:
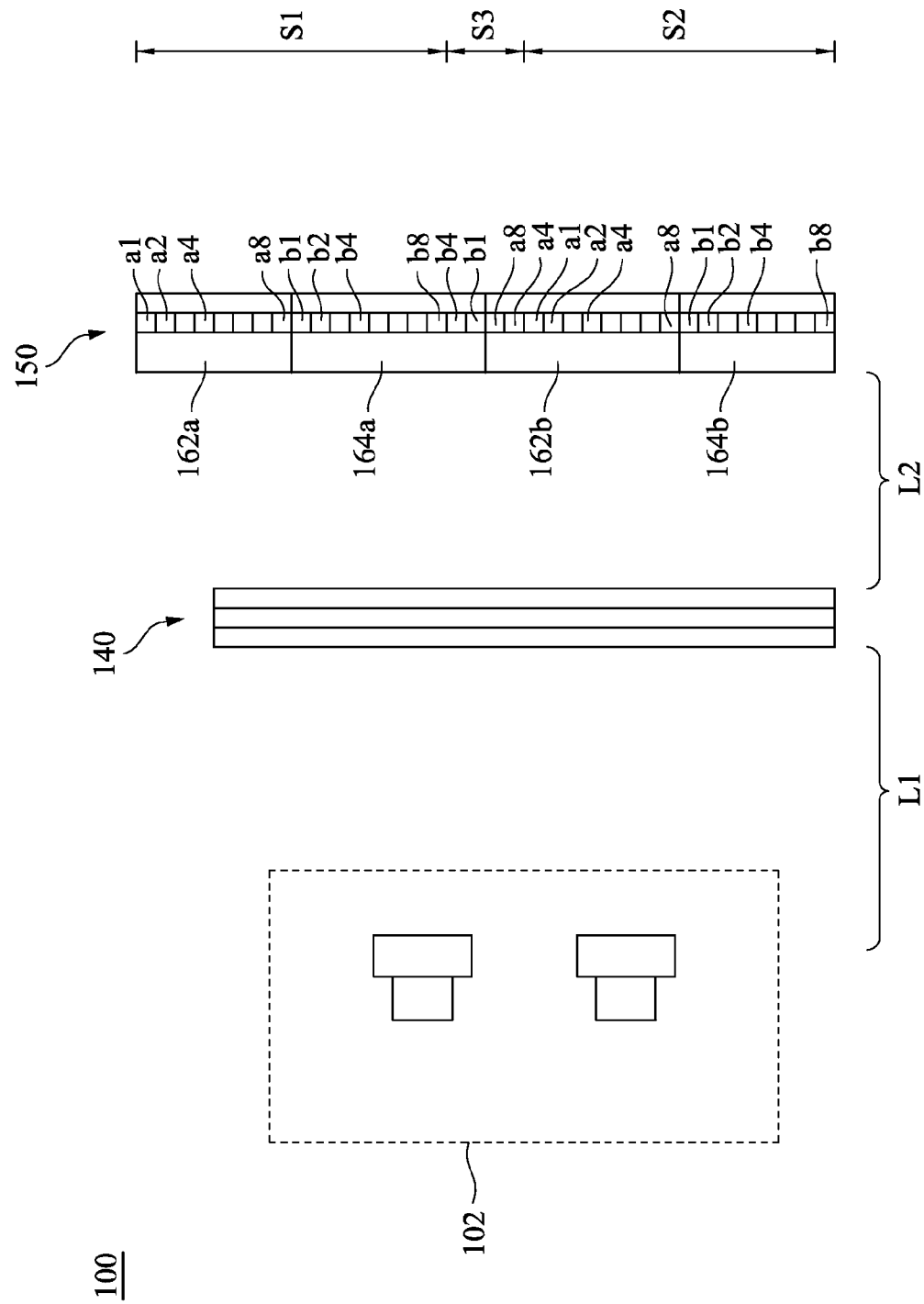
FIG. 8 is a schematic diagram showing an optical path of operating an autostereoscopic display device according to a second embodiment of the present invention.

FIG. 8 is a schematic diagram showing an optical path of operating an autostereoscopic display device according to a second embodiment of the present invention. The autostereoscopic display device 100 includes the projector module 102, the screen 140, and the window 150. In FIG. 8, images are projected from the projector module 102 to the screen 140 along a path L1, and the images are reflected from the screen 140 to the window 150 along a path L2. For the convenience of explanation, two optical paths that entering and reflected from the screen 140 in FIG. 3 are unfolded and redrawn as path L1 and path L2 in FIG. 8.

The difference between the first embodiment and the present embodiment is that a buffer region is disposed between the adjacent observing regions. For example, an observing region S3 is disposed between the first observing region S1 and the second observing region S2 as a buffer region.

In addition, the number of the liquid-crystal silts 172 corresponding to the first visual field 162b is controlled to be two, such that one of the first images (see FIG. 7) passes through two of the liquid-crystal silts 172 in the first visual field 162b of the window 150. Similarly, the number of the liquid-crystal silts 172 corresponding to the second visual field 164a is controlled to be two, such that one of the second images (see FIG. 7) passes through two of the liquid-crystal silts 172 in the second visual field 164a of the window 150. For the convenience of explanation, the liquid-crystal silts 172 of the present embodiment are respectively labeled.

At the first time interval, the liquid-crystal silts a1 and b1 corresponding to the first observing region S1 and the second observing region S2 are actuated. At the next time interval, the liquid-crystal silts a2 and b2 corresponding to the first observing region S1 and the second observing region S2 are actuated. After the sixteen liquid-crystal silts (from a1 to a8 and from b1 to b8) are respectively actuated for one turn, the output of an image is completed.

Further, images outputted from the liquid-crystal silt a1 corresponding to the first observing region S1 to the liquid-crystal silt b8 corresponding to the first observing region S1 form a complete set of the images. Similarly, images outputted from the liquid-crystal silt a1 corresponding to the second observing region S2 to the liquid-crystal silt b8 corresponding to the second observing region S2 form a complete set of the images.

Moreover, when the liquid-crystal silts a1, a8, b1, and b4 corresponding to the first observing region S1 and the second observing region S2 are actuated, the liquid-crystal silts a1, a8, b1, and b4 corresponding to the third observing region S3 are correspondingly actuated.

Therefore, in the third observing region S3, with the disposition of the liquid-crystal silts a1, a8, b1, and b4, the stereoscopic image is also provided in the third observing region S3, in which the stereoscopic image is formed from a portion of the images.

When autostereoscopic display device 100 outputs the images, users located at the first observing region S1 and the second observing region S2 can obtain the complete stereoscopic image. Further, thought the images corresponding to the third observing region S3 are formed by the opposite way and are partial, users located at the third observing region S3 still can obtain the stereoscopic image that are vaguer than the stereoscopic image corresponding to the first observing region S1 and the second observing region S2.

Since an autostereoscopic display device without the buffer region outputs the images with a clear boundary between the adjacent observing regions, a user cannot obtain a complete stereoscopic image when crossing the boundary. By using the above disposition in which no boundary between the adjacent observing regions exists, a user can obtain a continuous stereoscopic image when crossing the different observing regions. In other words, the third observing region S3 is regarded as the buffer region at the boundary between the first observing region S1 and the second observing region S2. However, a person having ordinary skill in the art may choose the proper number of the liquid-crystal silts corresponding to the third observing region S3 for defining the clarity of the images in the buffer region.

Figure 9:
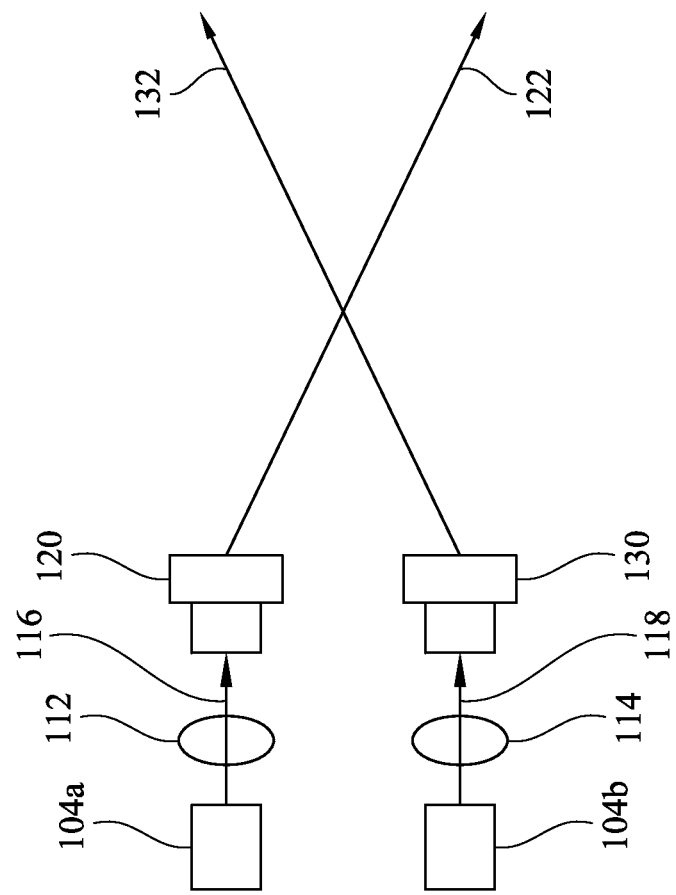
FIG. 9 is a schematic diagram of a projector module of an autostereoscopic display device according to another embodiment of the present invention.

In the following embodiments, the descriptions are made to discuss the variations of the projector module. FIG. 9 is a schematic diagram of a projector module of an autostereoscopic display device according to another embodiment of the present invention. In the present embodiment, each of the first projector 120 and the second projector 130 of the projector module 120 has a light source.

The projector module 120 includes a first light source 104a, a second light source 104b, a first polarizing beam splitter 112, and a second polarizing beam splitter 114. The first light source 104a is used for providing the first projector 120 with a first light beam 116. The first light beam 104a passing through the first polarizing beam splitter 112 is converted into the first polarization. The second light source 104b is used for providing the second projector 130 with a second light beam 118. The second light beam 118 passing through the second polarizing beam splitter 114 is converted into the second polarization.

By using the above disposition, the first image unit 122 provided by the first projector 120 is the first polarization, and the second image unit 132 provided by the second projector 130 is the second polarization.

Figure 10:
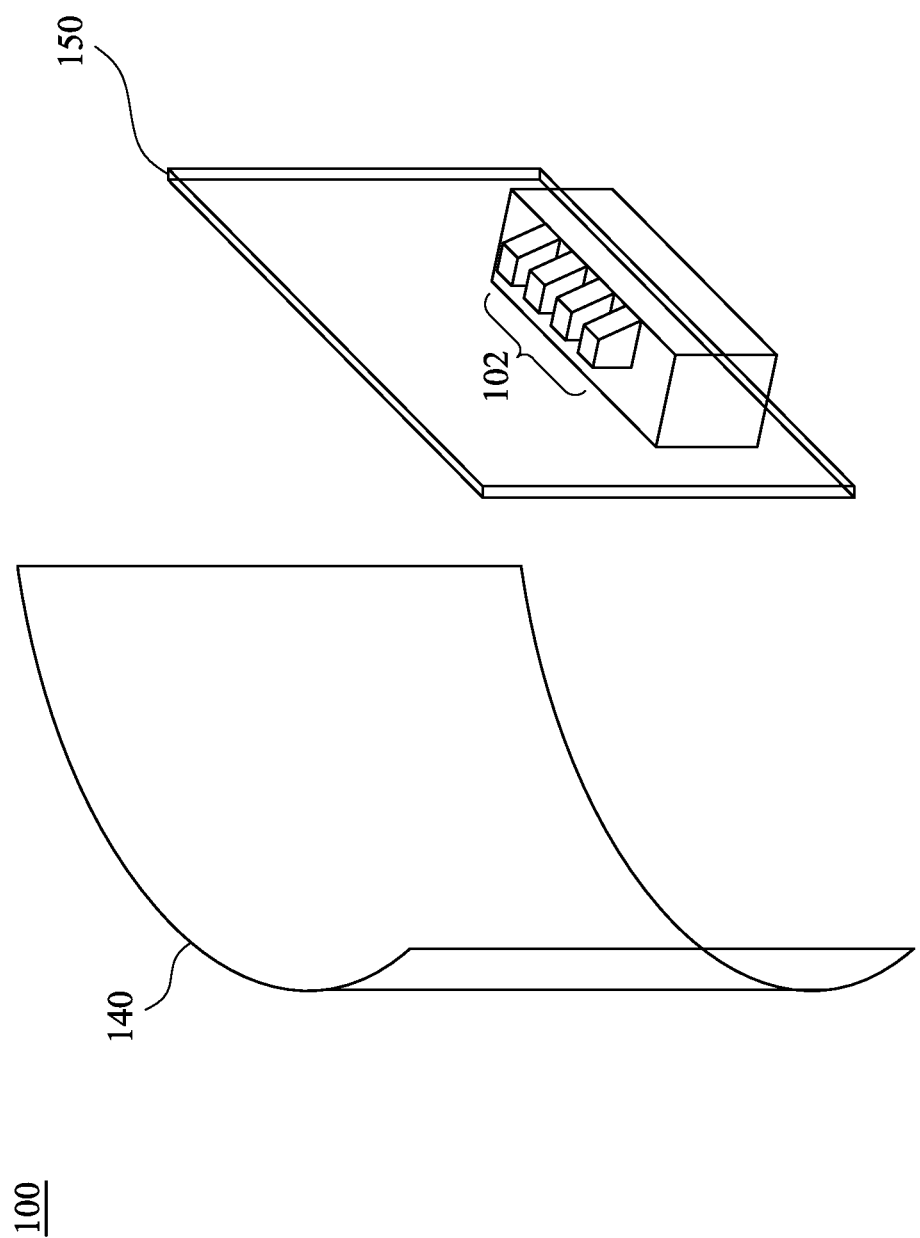
FIG. 10 is a schematic 3D diagram of an autostereoscopic display device according to the second embodiment of the present invention.

FIG. 10 is a schematic 3D diagram of an autostereoscopic display device according to the second embodiment of the present invention. An autostereoscopic display device 100 includes a projector module 102, a screen 140, and a window 150. The difference between the first embodiment and the present embodiment is that the number of the projector of the projector module 102 is twice as many as that in the first embodiment.

FIG. 11 is a schematic diagram showing an optical path of an autostereoscopic display device according to the second embodiment of the present invention. The autostereoscopic display device 100 includes the projector module 102, the screen 140 and the window 150. In FIG. 11, images are projected from the projector module 102 to the screen 140 along a path L1, and the images re reflected from the screen 140 to the window 150 along a path L2. For the convenience of explanation, two optical paths that entering and reflected from the screen 140 in FIG. 3 are unfolded and redrawn as path L1 and path L2 in FIG. 11.

The projector module 102 includes first projectors 120a-120b and second projectors 130a-130b. The first projectors 120a-120b are used for providing a first image unit with a first polarization, and the second projectors 130a-130b are used for providing a second image unit with a second polarization. In the present embodiment, the numbers of the first projectors 120a-120b and the second projectors 130a-130b are two.

Similarly, the disposition of light sources 104 together with polarizing beam splitter modules 106 is used for providing the first projectors 120a-120b and the second projectors 130a-130b as the source of light beams, in which the numbers of the light sources 104 and the polarizing beam splitter modules 106 are corresponding to the numbers of the light sources 104 and polarizing beam splitter modules 106. In addition, the first projector 120a and the second projector 130a respectively project images on a first visual field 162a and a second visual field 164a, and the first projector 120b and the second projector 130b respectively project images on a first visual field 162b and a second visual field 164b. In other words, the numbers of the first projectors 120a-120b and the first visual fields 162a-162b are the same, and the numbers of the second projectors 130a-130b and the second visual fields 164a-164b are the same. As previously described, the images provided by the first projectors 120a-120b and the second projectors 130a-130b are respectively guided to the different first visual fields 162a and 162b and the second visual fields 164a and 164b by the lens (see FIG. 4).

In the present embodiment, a user obtains a stereoscopic image formed by actuating eight liquid-crystal silts 172 corresponding to the first visual fields 162a-162b and the second visual fields 164a-164b in turns (totally thirty-two liquid-crystal silts). The following describes the first observing region S1 with the autostereoscopic display device 100 outputting the images as an example.

At the first time interval, the first projectors 120a-120b respectively provide the first images 124a-124b, in which the first images 124a and 124b are different from each other. Similarly, the second projectors 130a-130b respectively provide the second images 134a-134b, in which the second images 134a and 134b are different from each other.

At the same time, the liquid-crystal silts 172a corresponding to the first visual fields 162a-162b and the second visual fields 164a-164b are actuated. In other words, at the same time interval, four images corresponding to the first observing region S1 are provided through the first visual fields 162a-162b and the second visual fields 164a-164b. At the next time interval, the liquid-crystal silts 172b corresponding to the first visual fields 162a-162b and the second visual fields 164a-164b are actuated. Since the number of the liquid-crystal silts corresponding to the first observing region S1 is thirty-two, the thirty-two liquid-crystal silts corresponding to the first observing region S1 finish outputting in eight time intervals under four liquid-crystal silts are actuated at each time interval.

Furthermore, a stereoscopic image of the present embodiment is formed by the thirty-two liquid-crystal silts. As the number of the projector is four, each of the projectors outputs eight images for outputting a complete stereoscopic image at each time interval, and therefore the resolution of the stereoscopic image is improved.

In the first embodiment, a stereoscopic image is outputted by actuating sixteen liquid-crystal silts in turns, and each of the projectors corresponds to eight liquid-crystal silts. In comparison with the first embodiment, since the number of the projectors of the present embodiment is four, each of the projectors of the present embodiment corresponds to four liquid-crystal silts as a stereoscopic image is outputted by actuating sixteen liquid-crystal silts in turns (like the first embodiment). Therefore, When FPS of the autostereoscopic display device 100 is sixty, since the number of the liquid-crystal silts corresponding to each of the projectors is one half of that of the first embodiment, the FPS of each of the projectors is also one half of that of the first embodiment. Similarly, if the number of the projectors is n times of that of the first embodiment, the FPS of each of the projectors is divided as n times of that of the first embodiment.

In the present embodiment, with the number of the projectors is increased, the autostereoscopic display device 100 keeps the same FPS with FPS of the projectors decreased. Therefore, the quality of the stereoscopic images outputted by the autostereoscopic display device 100 is improved. Moreover, when the autostereoscopic display device 100 is applied to a large-scale display, even though the number of the liquid-crystal silts of the window 150 is increased, the resolution of the stereoscopic images is maintained by disposing multiple projectors.

Accordingly, the autostereoscopic display device of the present invention outputs images that an observer can obtain the images without wearing glasses. The images provided by the projector module are guided to the window by the screen. The first visual fields and the second visual fields are disposed on the window, such that the images with different angles are not interfered with each other. Further, the images selectively pass through the window, such that the observer can obtain a stereoscopic image from an observing surface.

In addition, the boundary of the adjacent observing regions are removed by controlling the liquid-crystal silts, such that the stereoscopic image provided by the autostereoscopic display device of the present invention is continuously outputted between the adjacent observing regions. Furthermore, by controlling the number of the projectors, FPS of each of the projectors can be adjusted, such that output of the autostereoscopic display device is controllable and resolution and brightness of the stereoscopic image are improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An autostereoscopic display device, comprising:
  a projector module, comprising:
    a first projector configured to provide a first image unit with a first polarization, wherein the first image unit comprises a plurality of first images provided in a time sequence; and
    a second projector configured to provide a second image unit with a second polarization, wherein the second image unit comprises a plurality of second images displayed in the time sequence;
  a screen configured to reflect the first image unit and the second image unit; and
  a window, wherein the screen is disposed at the same side of the projector module and the window, and a projective location by the projector module on the window is at an edge of the window, wherein the window comprises:
    a divided visual-field area configured to receive the first image unit and the second image unit from the screen, wherein the divided visual-field area comprises a plurality of first visual fields and a plurality of second visual fields, wherein the first visual fields allow a light beam with the first polarization to pass therethrough, and the second visual fields allow a light beam with the second polarization to pass therethrough; and
    a liquid-crystal silt layer configured to allow a portion of the first image unit and a portion of the second image unit passing through the divided visual-field area to pass therethrough.

2. The autostereoscopic display device of claim 1, wherein the projector module further comprises:
a light source configured to provide light; and
a polarizing beam splitter module comprising a mirror and a polarizing beam splitter configured to convert the light into a first light beam with the first polarization and a second light beam with the second polarization, wherein the first light beam is reflected from the polarizing beam splitter to the first projector, and the second light beam is reflected from the mirror to the second projector.

3. The autostereoscopic display device of claim 1, wherein the projector module further comprises:
a first light source configured to provide the first projector with a first light beam;
a first polarizing beam splitter, wherein the first light beam passing through the first polarizing beam splitter is converted into the first light beam with only the first polarization;
a second light source configured to provide the second projector with a second light beam; and
a second polarizing beam splitter, wherein the second light beam passing through the second polarizing beam splitter is converted into the second light beam with only the second polarization.

4. The autostereoscopic display device of claim 1, wherein the screen has a curved surface, and a curvature center of the curved surface is located at the same side with the projector module.

5. The autostereoscopic display device of claim 1, wherein the screen further comprises a lens configured to respectively guide the first image unit and the second image unit provided by the projector module to the first visual fields and the second visual fields.

6. The autostereoscopic display device of claim 1, wherein the liquid-crystal silt layer comprises:
a plurality of liquid-crystal silts configured to define the polarization of the light beam entering the liquid-crystal silt layer; and
a polarizing filter disposed at a side of the liquid-crystal silts opposite to the divided visual-field area, wherein the polarizing filter allows the light beam with one single polarization to pass therethrough.

7. The autostereoscopic display device of claim 6, wherein the number of the liquid-crystal silts corresponding to each of the first visual fields and the number of the liquid-crystal silts corresponding to each of the second visual fields are the same.

8. The autostereoscopic display device of claim 1, wherein the window further comprises:
a polarizing plate disposed on the divided visual-field area for allowing a light beam with the first polarization to pass therethrough; and
a plurality of wave plates disposed on a portion of the polarizing plate, wherein the wave plates are half-wave plates, and projective locations of the wave plates with the divided visual-field area coincide with the second visual fields, and exposed areas of the polarizing plate on which no wave plates are disposed coincide with the first visual fields.

9. The autostereoscopic display device of claim 1, wherein the window further comprises:
a plurality of first polarizing sheets disposed on the divided visual-field area for allowing the light beam with the first polarization to pass therethrough, wherein projective locations of the first polarizing sheets on the divided visual-field area coincide with the first visual fields; and
a plurality of second polarizing sheets disposed on the divided visual-field area for allowing light beam with the second polarization to pass therethrough, wherein projective locations of the second polarizing sheets on the divided visual-field area coincide with the second visual fields.

10. A method for providing an autostereoscopic display, the method comprising:
providing at least one first projector for providing a first image unit with a first polarization, wherein the first image unit comprises a plurality of first images provided in a time sequence;
providing at least one second projector for providing a second image unit with a second polarization, wherein the second image unit comprises a plurality of second images provided in the time sequence;
projecting the first image unit and the second image unit on a screen;
reflecting the first image unit and the second image unit from the screen to a window, wherein the window comprises a plurality of first visual fields and a plurality of second visual fields arranged alternately, the first visual fields allow a light beam with the first polarization to pass therethrough, and the second visual fields allow a light beam with the second polarization to pass therethrough; and
controlling a plurality of liquid-crystal silts of the window to be actuated in the time sequence, wherein the first images and the second images respectively pass through the liquid-crystal silts actuated in the first visual fields and the second visual fields.

11. The method of claim 10, further comprising:
guiding the first image unit and the second image unit to the first visual fields and the second visual fields by using a lens of the screen.

12. The method of claim 10, wherein the step of controlling the liquid-crystal silts of the window further comprises:
controlling two of the liquid-crystal silts corresponding to each of the first visual fields, such that one of the first images passes through the two liquid-crystal silts of each of the first visual fields of the window; and
controlling two of the liquid-crystal silts corresponding to each of the second visual fields, such that one of the second images passes through the two liquid-crystal silts of each of the second visual fields of the window.

13. The method of claim 10, wherein the numbers of the first projectors and the first visual fields are the same, and the first image units of the first projectors are respectively guided to the different first visual fields, wherein the numbers of the second projectors and the second visual fields are the same, and the second image units of the second projectors are respectively guided to the different second visual fields.

* * * * *